(12) United States Patent
Weyna et al.

(10) Patent No.: US 11,441,820 B2
(45) Date of Patent: Sep. 13, 2022

(54) REFRIGERANT LEAK DETECTION SYSTEM

(71) Applicant: Carrier Corporation, Palm Beach Gardens, FL (US)

(72) Inventors: Paul V. Weyna, Manlius, NY (US); Jason D. Scarcella, Cicero, NY (US); Mark J. Perkovich, Fayetteville, NY (US); Lei Chen, South Windsor, CT (US); Hai Tian, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/254,746

(22) PCT Filed: Sep. 5, 2019

(86) PCT No.: PCT/US2019/049721
§ 371 (c)(1),
(2) Date: Dec. 21, 2020

(87) PCT Pub. No.: WO2020/051314
PCT Pub. Date: Mar. 12, 2020

(65) Prior Publication Data
US 2021/0268875 A1 Sep. 2, 2021

Related U.S. Application Data

(60) Provisional application No. 62/727,682, filed on Sep. 6, 2018.

(30) Foreign Application Priority Data

Apr. 18, 2019 (CN) .......................... 201910312955.3

(51) Int. Cl.
*B60H 1/00* (2006.01)
*B60H 1/32* (2006.01)
(Continued)

(52) U.S. Cl.
CPC ........... *F25B 1/00* (2013.01); *B60H 1/00485* (2013.01); *B60H 1/3205* (2013.01);
(Continued)

(58) Field of Classification Search
CPC .. B60H 1/3205; B60H 1/3225; B60H 1/3227; B60H 1/3232; B60H 2001/325;
(Continued)

(56) References Cited

U.S. PATENT DOCUMENTS 5,918,475 A 7/1999 Sakakibara et al.
5,946,939 A 9/1999 Matsushima et al.
(Continued)

FOREIGN PATENT DOCUMENTS

CN 103496311 A 1/2014
CN 203511428 U 4/2014
(Continued)

OTHER PUBLICATIONS

International Search Report dated Nov. 27, 2019; International Application No. PCT/US2019/049721; International Filing Date Sep. 5, 2019 (5 pgs).

(Continued)

*Primary Examiner* — Marc E Norman
(74) *Attorney, Agent, or Firm* — Cantor Colburn LLP

(57) ABSTRACT

A method of mitigating refrigerant leaks within a refrigeration system that includes: detecting a leak of a refrigerant from a refrigeration system; closing a first valve to inhibit a fluid flow of the refrigerant between an evaporator and a condenser fluidly connected to the evaporator; and operating a compressor to direct another fluid flow of the refrigerant from the evaporator to the compressor.

16 Claims, 5 Drawing Sheets

(51) Int. Cl.
*F25B 41/34* (2021.01)
*F25B 41/39* (2021.01)
*F25B 1/00* (2006.01)

(52) U.S. Cl.
CPC ........ *B60H 1/3225* (2013.01); *B60H 1/3227* (2013.01); *B60H 1/3232* (2013.01); *F25B 41/34* (2021.01); *F25B 41/39* (2021.01); *B60H 2001/325* (2013.01); *B60H 2001/3252* (2013.01); *B60H 2001/3272* (2013.01)

(58) Field of Classification Search
CPC .... B60H 2001/3252; B60H 2001/3272; F25B 2500/22; F25B 2500/221; F25B 2500/222
See application file for complete search history.

(56) References Cited

U.S. PATENT DOCUMENTS

| | | | |
|---|---|---|---|
| 6,073,455 | A | 6/2000 | Tachigori et al. |
| 7,143,591 | B2 | 12/2006 | Nonaka et al. |
| 8,024,937 | B2 | 9/2011 | Minor |
| 8,610,588 | B2 | 12/2013 | Asprovski et al. |
| 9,568,227 | B2 | 2/2017 | Douglas et al. |
| 9,879,871 | B2 | 1/2018 | Goel et al. |
| 10,151,663 | B2 | 12/2018 | Sencarello |
| 10,866,004 | B2* | 12/2020 | Shiohama ............. F25B 49/005 |
| 11,143,439 | B2* | 10/2021 | Matsuda ................. F24F 11/36 |
| 2005/0103029 | A1 | 5/2005 | Kawahara et al. |
| 2009/0272135 | A1 | 11/2009 | Nishimura et al. |
| 2018/0073762 | A1 | 3/2018 | Yajima et al. |
| 2018/0142931 | A1 | 5/2018 | Takagi |
| 2018/0283718 | A1 | 10/2018 | Honda et al. |
| 2018/0327179 | A1 | 11/2018 | Papas et al. |
| 2018/0328643 | A1 | 11/2018 | Eddy et al. |
| 2018/0347896 | A1 | 12/2018 | Eddy et al. |
| 2020/0011560 | A1* | 1/2020 | Minamida ............... G01M 3/00 |
| 2020/0240686 | A1* | 7/2020 | Yajima ................... F25B 13/00 |

FOREIGN PATENT DOCUMENTS

| | | |
|---|---|---|
| CN | 107323334 A | 11/2017 |
| EP | 0719995 A2 | 7/1996 |
| EP | 2302309 A1 | 3/2011 |
| EP | 2416095 | 2/2012 |
| EP | 2416095 A2 | 2/2012 |
| EP | 3252402 A1 | 6/2017 |
| EP | 3279580 A1 | 2/2018 |
| EP | 3318823 A1 | 5/2018 |
| EP | 2872864 B1 | 7/2018 |
| EP | 3358277 A1 | 8/2018 |
| EP | 3358278 A1 | 8/2018 |
| EP | 3418655 A1 | 12/2018 |
| EP | 3598037 A1 | 1/2020 |
| EP | 3637016 A1 | 4/2020 |
| GB | 2311625 A | 10/1997 |
| JP | H02140574 A | 5/1990 |
| JP | H0914782 A | 1/1997 |
| JP | H09264641 A | 10/1997 |
| JP | 2002286333 A | 10/2002 |
| JP | 2004116885 A | 4/2004 |
| JP | 2015209979 A | 11/2015 |
| JP | 2016191529 A | 11/2016 |
| JP | 2017067390 A | 4/2017 |
| JP | 2017067391 A | 4/2017 |
| WO | 03060401 A1 | 7/2003 |
| WO | 2004016999 A1 | 2/2004 |
| WO | 2010007448 A1 | 1/2010 |
| WO | 2013038704 A1 | 2/2013 |
| WO | 2015032905 A1 | 3/2015 |
| WO | 2018043721 A1 | 3/2018 |
| WO | 2018078729 A1 | 5/2018 |
| WO | 2018102934 A1 | 6/2018 |
| WO | 2017187618 A1 | 8/2018 |
| WO | 2018147428 A1 | 8/2018 |
| WO | 2018167820 A1 | 9/2018 |
| WO | 2018225257 A1 | 12/2018 |
| WO | 2017212599 A1 | 1/2019 |
| WO | 2018003096 A | 2/2019 |

OTHER PUBLICATIONS

Leak Detection and Automatic Refrigerant Pump Down; Panasonic; Retrieved: Jul. 23, 2018; https://www.aircon.panasonic.eu/IE_en/happening/leak-detection-and-automatic-refrigerant-pump-down/; 4 Pages.

Neil Wooldridge; "Pump Down Procedures on Toshiba VRF Air Conditioning Systems"; http://www.acrjournal.uk/features/pump-down-procedures-on-toshiba-vrf-air-conditioning; ACR Journal; Dec. 29, 2015; 1-9 pages.

PCT Invitation to Pay Additional Fees and, where applicable, protest fee; International Application No. PCT/US2020/049034; International Filing Date: Sept. 2, 2020; dated Nov. 13, 2020; pp. 1-10.

Written Opinion dated Nov. 27, 2019; International Application No. PCT/US2019/049721; International Filing Date Sep. 5, 2019 (7 pgs).

International Search Report; International Application No. PCT/US2020/049034; International Filing Date Sep. 2, 2020; dated Jan. 28, 2021; 8 pages.

Written Opinion of the International Searching Authority; International Application No. PCT/US2020/049034; International Filing Date Feb. 9, 2020; 11 pages.

International Preliminary Report on Patentability; dated Mar. 17, 2022; Application No. PCT/US2019/049721; Filed: Sep. 5, 2019; 6 pages.

* cited by examiner

REFRIGERANT LEAK DETECTION SYSTEM

BACKGROUND

Exemplary embodiments pertain to the art of refrigerated systems. More specifically, transportation refrigeration units.

Products may be shipped or stored within a conditioned space, such as a container, truck or trailer. These conditioned spaces utilize a refrigeration unit that circulates cooled air inside the interior volume. In many cases, the refrigeration unit uses a refrigeration cycle to cool the air. Refrigerant from the refrigeration unit may leak inside the conditioned space.

BRIEF DESCRIPTION

According to an embodiment, a refrigeration system is provided. The refrigeration system includes a compressor, a condenser, an evaporator, a leak sensor, and a controller. The compressor is driven by a power source and has a compressor outlet and a compressor inlet. The condenser has a condenser inlet fluidly connected to the compressor outlet and a condenser outlet. The evaporator has an evaporator inlet fluidly connected to the condenser outlet through a first valve movable between an open position and a closed position, and an evaporator outlet fluidly connected to the compressor inlet. The leak sensor is arranged to provide a signal indicative of a refrigerant. The controller is in communication with the first valve and the compressor. The controller is arranged to receive the signal and is programmed to command the first valve to move towards the closed position, responsive to the signal being indicative of the refrigerant.

In addition to one or more of the features described above, or as an alternative, further embodiments may include that the controller is further programmed to output for display an indicator.

In addition to one or more of the features described above, or as an alternative, further embodiments may include that the controller is further programmed to operate the compressor such that refrigerant within the evaporator is directed towards the compressor.

In addition to one or more of the features described above, or as an alternative, further embodiments may include that the controller is further programmed to command the compressor to stop operating, responsive to a fluid pressure between the evaporator outlet and the compressor outlet being less than a threshold pressure.

In addition to one or more of the features described above, or as an alternative, further embodiments may include a receiver having a receiver inlet fluidly connected to the condenser outlet, wherein the receiver is arranged to receive the refrigerant from the condenser.

In addition to one or more of the features described above, or as an alternative, further embodiments may include that the controller is arranged to receive the signal and programmed to command the first valve to move towards the closed position, responsive to the signal being indicative of a selected concentration of the refrigerant.

In addition to one or more of the features described above, or as an alternative, further embodiments may include that the controller is further programmed to operate an evaporator fan when refrigerant is detected.

In addition to one or more of the features described above, or as an alternative, further embodiments may include that a second valve fluidly connecting the evaporator outlet and the compressor inlet, the second valve being movable between an open position and a closed position.

In addition to one or more of the features described above, or as an alternative, further embodiments may include that the controller is further programmed to operate the compressor such that refrigerant within the evaporator is directed towards the compressor until a suction pressure measurement proximate an inlet of the compressor is less than an ambient pressure.

In addition to one or more of the features described above, or as an alternative, further embodiments may include that the controller is programmed to command the second valve to move towards the closed position when the suction pressure measurement proximate an inlet of the compressor is less than an ambient pressure.

In addition to one or more of the features described above, or as an alternative, further embodiments may include a main heat valve fluidly connecting the compressor outlet and the condenser inlet, the main heat valve being movable between an open position and a closed position, wherein the controller is programed to command the main heat valve to move to the open position.

In addition to one or more of the features described above, or as an alternative, further embodiments may include a hot gas valve fluidly connecting the compressor and the evaporator inlet, the hot gas valve being movable between an open position and a closed position, and wherein the controller is programed to command the hot gas valve to move to the closed position prior to commanding the first valve to move towards the closed position.

In addition to one or more of the features described above, or as an alternative, further embodiments may include that the evaporator and the leak sensor are located within a conditioned space of the refrigeration system, and wherein the first valve and the second valve are located outside of the conditioned space.

According to another embodiment, a method of mitigating refrigerant leaks within a refrigeration system is provided. The method includes: detecting a leak of a refrigerant from a refrigeration system; closing a first valve to inhibit a fluid flow of the refrigerant between an evaporator and a condenser fluidly connected to the evaporator; and operating a compressor to direct another fluid flow of the refrigerant from the evaporator to the compressor.

In addition to one or more of the features described above, or as an alternative, further embodiments may include directing the fluid flow of the refrigerant from the compressor to a receiver.

In addition to one or more of the features described above, or as an alternative, further embodiments may include operating an evaporator fan that is disposed proximate the evaporator.

In addition to one or more of the features described above, or as an alternative, further embodiments may include stopping operation of the compressor, responsive to an evaporator pressure being less than a threshold pressure.

In addition to one or more of the features described above, or as an alternative, further embodiments may include closing a second valve to inhibit a fluid flow of the refrigerant between the receiver and the condenser.

In addition to one or more of the features described above, or as an alternative, further embodiments may include closing a second valve to inhibit a fluid flow of the refrigerant between the evaporator and the compressor.

In addition to one or more of the features described above, or as an alternative, further embodiments may include that the method further includes: opening a main heat valve to allow a fluid flow of the refrigerant between the compressor and the condenser; and closing a hot gas valve to inhibit a fluid flow of the refrigerant between the compressor and the evaporator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 5:
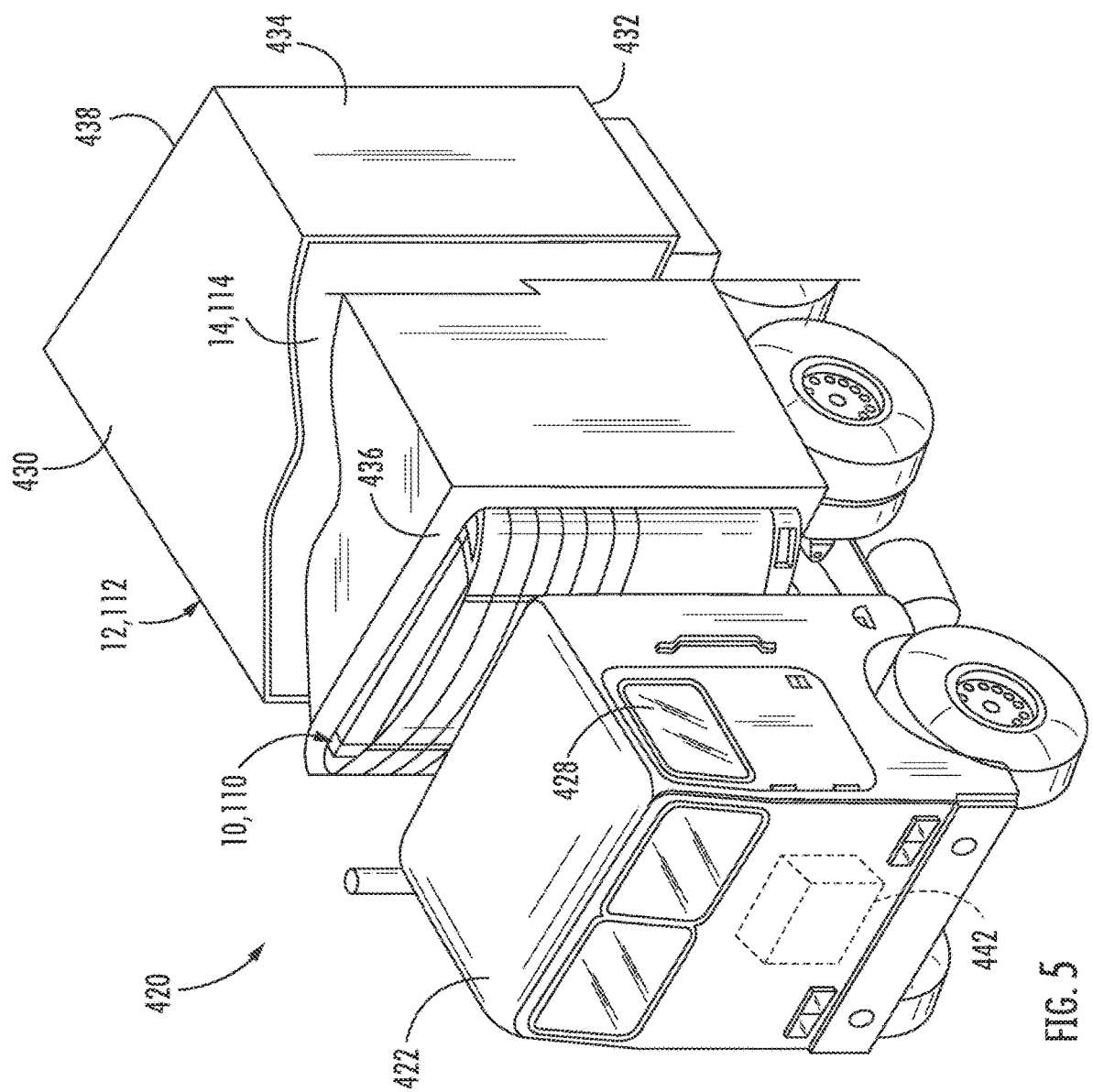
FIG. 5 is a perspective view of a transport system having a refrigeration system as one, non-limiting, according to an embodiment of the present disclosure.

Referring to FIG. 5, a transport system 420 of the present disclosure is illustrated. In the illustrated embodiment, the transport systems 420 may include a tractor or vehicle 422, a conditioned space 12, 112, and a refrigeration system 10, 100. The conditioned space 12, 112 may be pulled by a vehicle 422. It is understood that embodiments described herein may be applied to conditioned space that are shipped by rail, sea, air, or any other suitable container, thus the vehicle may be a truck, train, boat, airplane, helicopter, etc.

The vehicle 422 may include an operator's compartment or cab 428 and a vehicle motor 442. The vehicle 22 may be driven by a driver located within the cab, driven by a driver remotely, driven autonomously, driven semi-autonomously, or any combination thereof. The vehicle motor 442 may be an electric or combustion engine powered by a combustible fuel. The vehicle motor 442 may also be part of the power train or drive system of the trailer system (i.e., conditioned space 12, 112), thus the vehicle motor 442 is configured to propel the wheels of the vehicle 22 and/or the wheels of the conditioned space 12, 112. The vehicle motor 442 may be mechanically connected to the wheels of the vehicle 422 and/or the wheels of the conditioned space 12, 112.

The conditioned space 12, 112 may be coupled to the vehicle 22 and is thus pulled or propelled to desired destinations. The conditioned space 12, 112 may include a top wall 430, a bottom wall 432 opposed to and spaced from the top wall 430, two side walls 434 spaced from and opposed to one-another, and opposing front and rear walls 436, 438 with the front wall 436 being closest to the vehicle 422. The conditioned space 12, 112 may further include doors (not shown) at the rear wall 438, or any other wall. The walls 430, 432, 434, 436, 438 together define the boundaries of a refrigerated interior volume 14, 114. Typically, transport systems 420 are used to transport and distribute cargo, such as, for example perishable goods and environmentally sensitive goods (herein referred to as perishable goods). The perishable goods may include but are not limited to fruits, vegetables, grains, beans, nuts, eggs, dairy, seed, flowers, meat, poultry, fish, ice, blood, pharmaceuticals, or any other suitable cargo requiring cold chain transport. In the illustrated embodiment, the refrigeration system 10, 100 is associated with a conditioned space 12, 112 to provide desired environmental parameters, such as, for example temperature, pressure, humidity, carbon dioxide, ethylene, ozone, light exposure, vibration exposure, and other conditions to the refrigerated interior volume 14, 114. In further embodiments, the refrigeration system 10, 100 is a refrigeration system capable of providing a desired temperature and humidity range.

Figure 1:
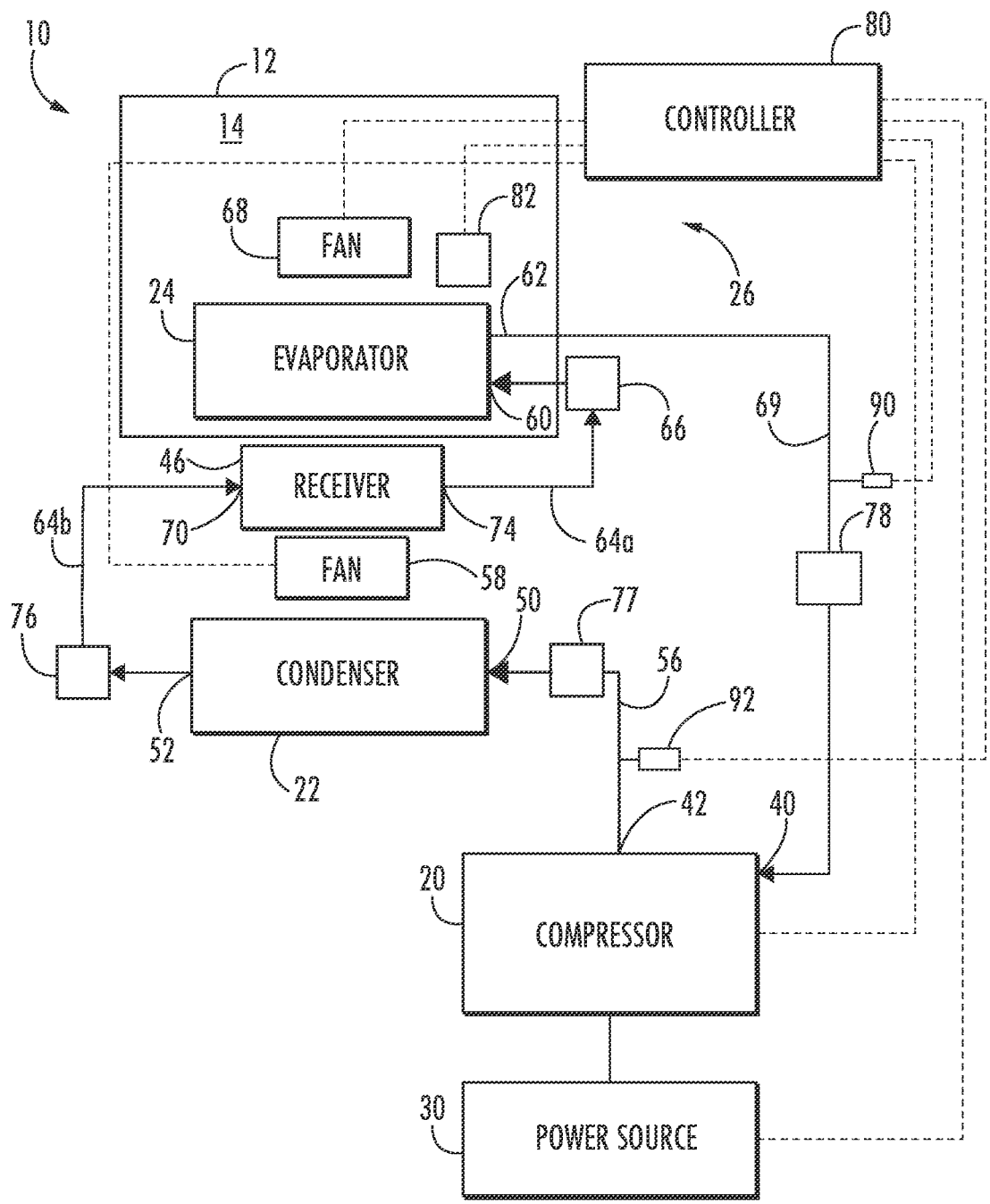
FIG. 1 is a schematic illustration of a refrigeration system.

Referring to FIG. 1, a conditioned space 12 may be provided with a refrigeration system 10 that provides conditioned air or cooled air to an interior volume 14 of the conditioned space 12. The conditioned space 12 may include but is not limited to a refrigerated trailer, a refrigerated truck, a refrigerated space, or a refrigerated container. The refrigeration system 10 may be adapted to operate using a refrigerant such as a low global warming potential refrigerant including A1, A2, A2L, A3, etc. In some cases, the refrigerant may leak into the interior volume 14 and may present a hazard should the concentration of the leaked refrigerant within the interior volume 14 exceed a threshold level. The threshold level may be a lower flammability limit of the refrigerant. The evaporator 24, a portion of a refrigerant line 69 proximate an evaporator outlet 62, and a portion of a refrigerant line 64a proximate an evaporator inlet 60 may be located within the interior volume 14 of the conditioned space 12 and thus may be a potential source of a refrigerant leak into the interior volume 14.

The refrigeration system 10 may be a transport refrigeration system such as a transportation refrigeration unit. The refrigeration system 10 includes a compressor 20, a condenser 22, an evaporator 24, and a leak detection system 26 that is arranged to detect and mitigate the presence of refrigerant within an interior volume 14.

The compressor 20 is powered by or driven by a power source 30. The power source 30 may be an internal combustion engine that drives a generator that is arranged to provide power to the compressor through a belt or otherwise provide power to the compressor 20 and other components of the refrigeration system 10.

The compressor 20 is arranged to receive refrigerant through a compressor inlet 40 from the evaporator 24. The compressor 20 is arranged to discharge refrigerant through a compressor outlet 42 to the condenser 22 through a receiver 46.

The condenser 22 is arranged to receive a fluid flow of refrigerant from the compressor 20 through a condenser inlet 50 and is arranged to discharge a fluid flow of refrigerant through a condenser outlet 52 to the receiver 46. The condenser inlet 50 is fluidly connected to the compressor outlet 42 through a refrigerant line 56.

A fan such as a condenser fan 58 may be associated with the condenser 22. The condenser fan 58 is disposed proximate the condenser 22.

The evaporator 24 is arranged to receive a fluid flow of refrigerant from the condenser 22 through an evaporator inlet 60 and is arranged to discharge a fluid flow of refrigerant to the compressor 20 through an evaporator outlet 62. The evaporator inlet 60 is fluidly connected to the condenser outlet 52 through the receiver 46 via a refrigerant line 64a, b through a first valve 66 and/or a second valve 76 that is disposed on an opposite side of the receiver 46 than the first valve 66. The evaporator outlet 62 is fluidly connected to the compressor inlet 40 through a refrigerant line 69.

The first valve 66 may be an expansion valve such as an electronic expansion valve, a movable valve, or a thermal expansion valve. The first valve 66 is movable between an open position and a closed position to selectively inhibit and facilitate a fluid flow of refrigerant between the evaporator 24 and at least one of the condenser 22 and the receiver 46. The open position facilitates a fluid flow of refrigerant between the evaporator inlet 60 and the condenser outlet 52 through the receiver 46. The closed position inhibits a fluid flow of refrigerant between the evaporator inlet 60 and the condenser outlet 52 through the receiver 46 as well as inhibits a fluid flow of refrigerant between the receiver 46 and the evaporator inlet 60.

A fan such as an evaporator fan 68 may be associated with the evaporator 24. The evaporator fan 68 is disposed proximate the evaporator 24.

The receiver 46 is fluidly connected to the condenser 22 and the evaporator 24 and is arranged to receive and store refrigerant based on a position of at least one of the first valve 66 and/or the second valve 76. The receiver 46 is arranged to receive refrigerant from the condenser outlet 52 through a first receiver inlet 70 via the refrigerant line 64b. In at least one embodiment, the second valve 76 is arranged to selectively facilitate a fluid flow between the condenser outlet 52 and the first receiver inlet 70. The second valve 76 may be a movable valve, a solenoid valve, a liquid service valve, a thermal expansion valve, or an electronic expansion valve. The second valve 76 is movable between an open position and a closed position. The open position facilitates a fluid flow of refrigerant between the condenser outlet 52 and the first receiver inlet 70. The closed position inhibits a fluid flow of refrigerant between the condenser outlet 52 and the first receiver inlet 70. The receiver 46 is arranged to discharge or provide a fluid flow of refrigerant through a receiver outlet 74 to the evaporator inlet 60 via the first valve 66 through the refrigerant line 64a.

A third valve 77 may be arranged to selectively facilitate a fluid flow between the compressor outlet 42 and the condenser inlet 50. The third valve 77 may be a movable valve, check valve, a liquid service valve, a thermal expansion valve, or an electronic expansion valve. The third valve 77 is movable between an open position and a closed position. The open position facilitates a fluid flow of refrigerant between the compressor outlet 42 and the condenser inlet 50. The closed position inhibits a fluid flow of refrigerant between the compressor outlet 42 and the condenser inlet 50. Alternatively, the third valve 77 may be interposed in refrigerant line 69.

A fourth valve 78 may be arranged to selectively facilitate a fluid flow between the evaporator outlet 62 and the compressor inlet 40. The fourth valve 78 may be a movable valve, check valve, a liquid service valve, a thermal expansion valve, or an electronic expansion valve. The fourth valve 78 is movable between an open position and a closed position. The open position facilitates a fluid flow of refrigerant between the evaporator outlet 62 and the compressor inlet 40. The closed position inhibits a fluid flow of refrigerant between the evaporator outlet 62 and the compressor inlet 40.

In an embodiment, the first valve 66, the second valve 76, the third valve 77, and the fourth valve 78 may be located outside of the conditioned space 12.

As stated previously, the open position of the first valve 66 facilitates a fluid flow of refrigerant between the receiver outlet 74 and the evaporator inlet 60. The closed position of the first valve 66 inhibits a fluid flow of refrigerant between the receiver outlet 74 and the evaporator inlet 60.

The leak detection system 26 includes a controller 80 and a leak sensor 82. The leak sensor 82 may be configured to detect refrigerant, detect a selected concentration of the refrigerant, and/or calculate a concentration of refrigerant.

The controller 80 may be a controller that is provided with the transport refrigeration unit or may be a separately provided controller.

The controller 80 is provided with input communication channels that are arranged to receive information, data, or signals from, for example, the compressor 20, the power source 30, the condenser fan 58, the first valve 66, the evaporator fan 68, the second valve 76, a pressure sensor 90, a compressor discharge pressure sensor 92, and the leak sensor 82. The controller 80 is provided with output communication channels that are arranged to provide commands, signals, or data to, for example, the compressor 20, the power source 30, the condenser fan 58, the first valve 66, the evaporator fan 68, and the second valve 76. The controller 80 is provided with at least one processor that is programmed to execute a leak detection and/or leak mitigation strategy based on information, data, or signals provided via the input communication channels and output commands via the output communication channels.

The leak sensor 82 is arranged to provide a signal indicative of a concentration, an amount, or the presence of refrigerant within the interior volume 14 to the controller 80. The leak sensor 82 may be disposed proximate the evaporator 24 and/or may be disposed proximate the refrigerant line 69 or any other refrigerant line or component that could leak refrigerant into the conditioned space 12. The leak sensor 82 may also be located near a likely location where refrigerant may collect, such as near a floor of the container 12.

Figure 2:
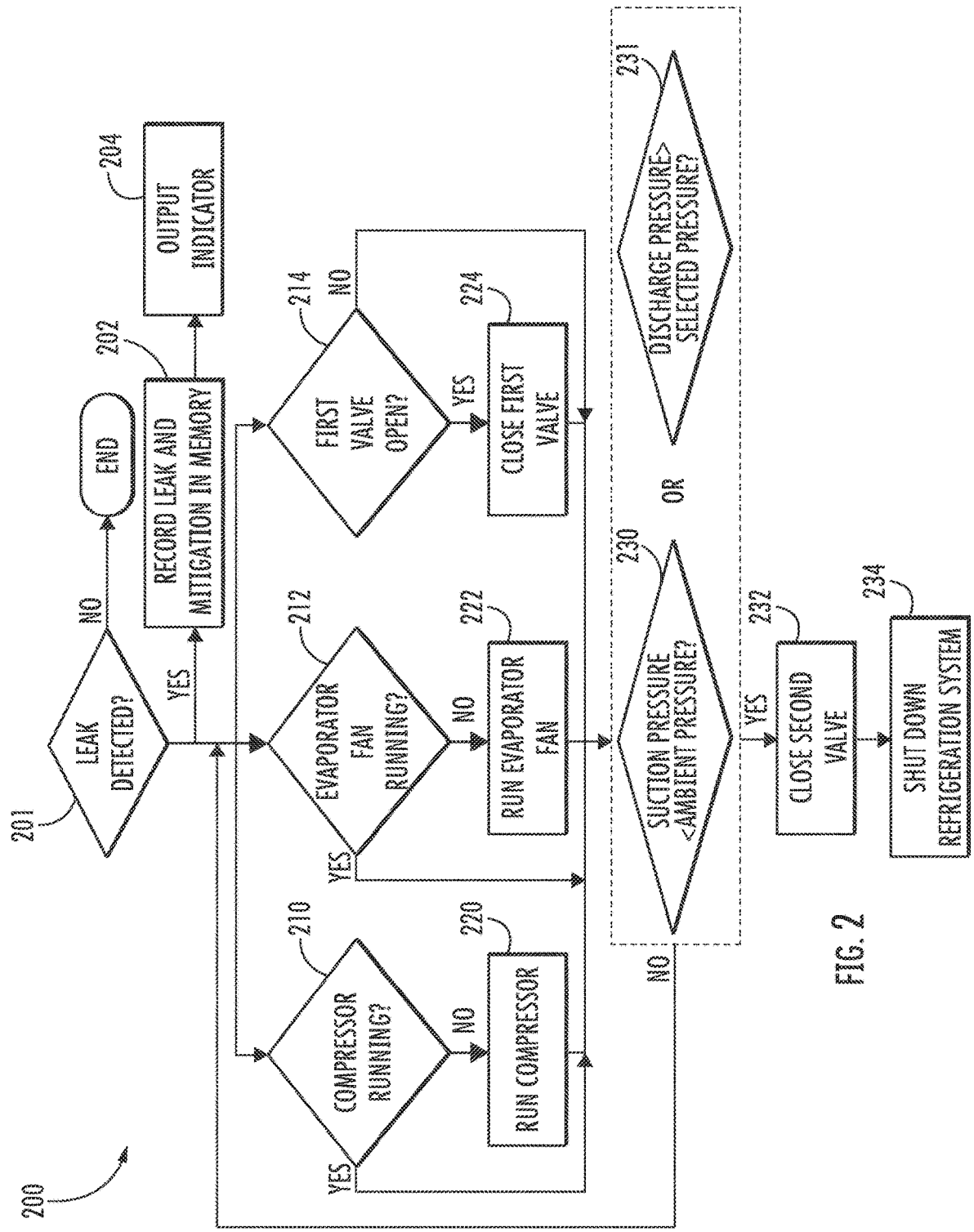
FIG. 2 is a flowchart illustrating a method of refrigerant leak mitigation for a refrigeration system

Responsive to the signal from the leak sensor 82 being indicative of a concentration of refrigerant greater than a threshold concentration or the signal being indicative of the presence of refrigerant within the interior volume 14, the controller 80 may perform leak mitigation as illustrated by the flow chart in FIG. 2.

Referring to FIG. 2, with continued references to FIG. 1, a method 200 of leak detection in a refrigeration system 10 is illustrated in accordance with an embodiment of the present disclosure. In an embodiment, the method 200 may be performed by the controller 80. At block 201, should the leak sensor 82 not detect the presence of refrigerant or the concentration of refrigerant greater than a threshold concentration, the method may end and/or continuously check for refrigerant leaks on a recurring basis. If the leak sensor 82 detects the presence of refrigerant or detects the concentration of refrigerant greater than a threshold concentration, the method 200 may continue to block 202. At block 202, the controller 80 may record the leak and the entrance of the leak mitigation strategy into memory. At block 204, the controller 80 is programmed to output for display an indicator. The indicator may be an auditory indicator, a visual indicator, or the like. In at least one embodiment, the controller 80 may transmit information or data indicative of the leak to a driver, operator, remote computing system, a remote monitoring system, or a display.

The controller 80 may assess the operational state of various components of the refrigeration system 10, in parallel, substantially simultaneously, or sequentially. At block 210, the controller 80 may assess whether the compressor 20 is on and operational (e.g. running). At block 212, the controller 80 may assess whether the evaporator fan 68 is on and operational (e.g. running). At block 214, the controller 80 may assess the position of the first valve 66.

Should the compressor 20 not be running at block 210, the controller 80 may command that the compressor 20 to operate, at block 220. If the compressor is running at block 210, the method 200 may continue to block 230.

Should the evaporator fan 68 not be running at block 212, the controller 80 may command that the evaporator fan 68 operate at block 222. The operation of the evaporator fan 68 may facilitate the disbursement or dilution of refrigerant proximate the evaporator 24. The operation of the evaporator fan 68 may facilitate the releasing or venting of refrigerant from within the interior volume 14 towards an external environment. In at least one embodiment, should the evaporator fan 68 not be running at block 212, the controller 80 may inhibit the evaporator fan 68 from operating. The inhibition of operation of the evaporator fan 68 may prevent refrigerant from being released or vented into an external environment. If the evaporator fan 68 is running at block 212, the method 200 may continue to block 230.

Should the first valve 66 be open at block 214, the controller 80 may command that the first valve 66 move towards the closed position, at block 224. The closing of the first valve 66 inhibits a fluid flow of refrigerant between the receiver outlet 74 and the evaporator inlet 60. The closing of the first valve 66 essentially inhibits the delivery of refrigerant to the evaporator 24 that may be the source of the refrigerant leak into the interior volume 14. If at least the first valve 66 is in a closed position, the method may contain the block 230.

The closing of the first valve 66 enables the compressor 20 to evacuate or pump down the evaporator 24 to slow or stop the refrigerant leak into the interior volume 14. The compressor 20 is operated while the first valve 66 is closed such that a fluid flow of refrigerant from the evaporator 24 is directed through the evaporator outlet 62 via the refrigerant line 69 towards the compressor inlet 40. The removal of refrigerant from the evaporator 24 may be referred to as a pump down of the evaporator 24. The compressor 20 directs the fluid flow of refrigerant from the evaporator 24, through the compressor outlet 20, and into the receiver 46 through the condenser inlet 50 and out of the condenser outlet 52 towards the first receiver inlet 70 such that the refrigerant is stored within the receiver 46. The closing of the first valve 66 inhibits the refrigerant that is present within the receiver 46 from being delivered to the evaporator 24. In at least one embodiment, should the second valve 76 be closed, the compressor 20 may pump down the evaporator 24 and direct the fluid flow of refrigerant from the evaporator 24 through the compressor 20 and towards the condenser 22. The flow of refrigerant is directed into the condenser 22 through the condenser inlet 50 and is inhibited from flowing towards the receiver 46 by the second valve 76 being in the closed position. The compressor 20 may be provided with an anti-backflow valve such that refrigerant received by the condenser 22 is retained or is received within the condenser 22 and/or between the compressor 20 is unable to flow back through the compressor outlet 42 towards the compressor inlet 40.

The method 200 may move onto block 230 or 231. At block 230, the method 200 may assess whether there is suction, such as a suction pressure less than an ambient pressure, within the refrigerant line 69 that extends between the evaporator 24 and the compressor 20. In such an embodiment, a pressure sensor 90 is configured to detect pressure within the refrigerant line 69 and communicate the detected pressure to the controller 80. At block 230, the method may alternatively assess a fluid pressure within the evaporator 24 (e.g. evaporator pressure) and determine whether the fluid pressure within the evaporator 24 is less than a threshold pressure. In such an embodiment, the pressure sensor 90 is disposed within or proximate the evaporator 24. Should the suction pressure be less than the ambient pressure or the evaporator pressure be less than a threshold pressure, the method 200 may continue to block 232. If the suction pressure is greater than the ambient pressure or the pressure within the evaporator 24 is greater than a threshold pressure, the method may return to block 210, block 212, and/or block 214.

Alternatively, the method may move to block 231 if a compressor discharge pressure is utilized rather than a suction pressure. For example, a compressor discharge pressure may be utilized if the fourth valve 78 is not present in the refrigeration system 10. At block 231, the method 200 may assess whether there is a discharge pressure at a compressor outlet 42 greater than a selected pressure, within the refrigerant line 56 that extends between the compressor 20 and the condenser 22. In such an embodiment, a compressor discharge pressure sensor 92 is configured to detect pressure within the refrigerant line 56 and communicate the detected pressure to the controller 80. Should the compressor discharge pressure be greater than the selected pressure, the method 200 may continue to block 232. If the compressor discharge pressure is not greater than the selected pressure, the method may return to block 210, block 212, and/or block 214.

At block 232, should the second valve 76 be in an open position, the controller 80 may command the second valve 76 to close such that the refrigerant within the receiver 46 is inhibited from escaping the receiver 46 and flowing toward either the evaporator 24 and/or the condenser 22. At block 334, the refrigeration system 110 is shut down.

The leak mitigation strategy utilizing the pump down process greatly reduces the risk of the refrigerant reaching the lower flammability limit by removing and storing refrigerant from the evaporator 24 within at least one of the receiver 46 or the condenser 22 outside of the interior volume 14. The leak mitigation strategy may also dilute or disperse refrigerant that may be present within the interior volume 14 of the conditioned space 12. If a refrigerant leak is in an area that is not exposed to the interior volume 14 than the refrigerant may dissipate on its own. Additionally, the operation of the condenser fan 58 may facilitate the disbursement or dilution of refrigerant proximate the condenser 22 and may be utilized at any time during the method 200.

Figure 3:
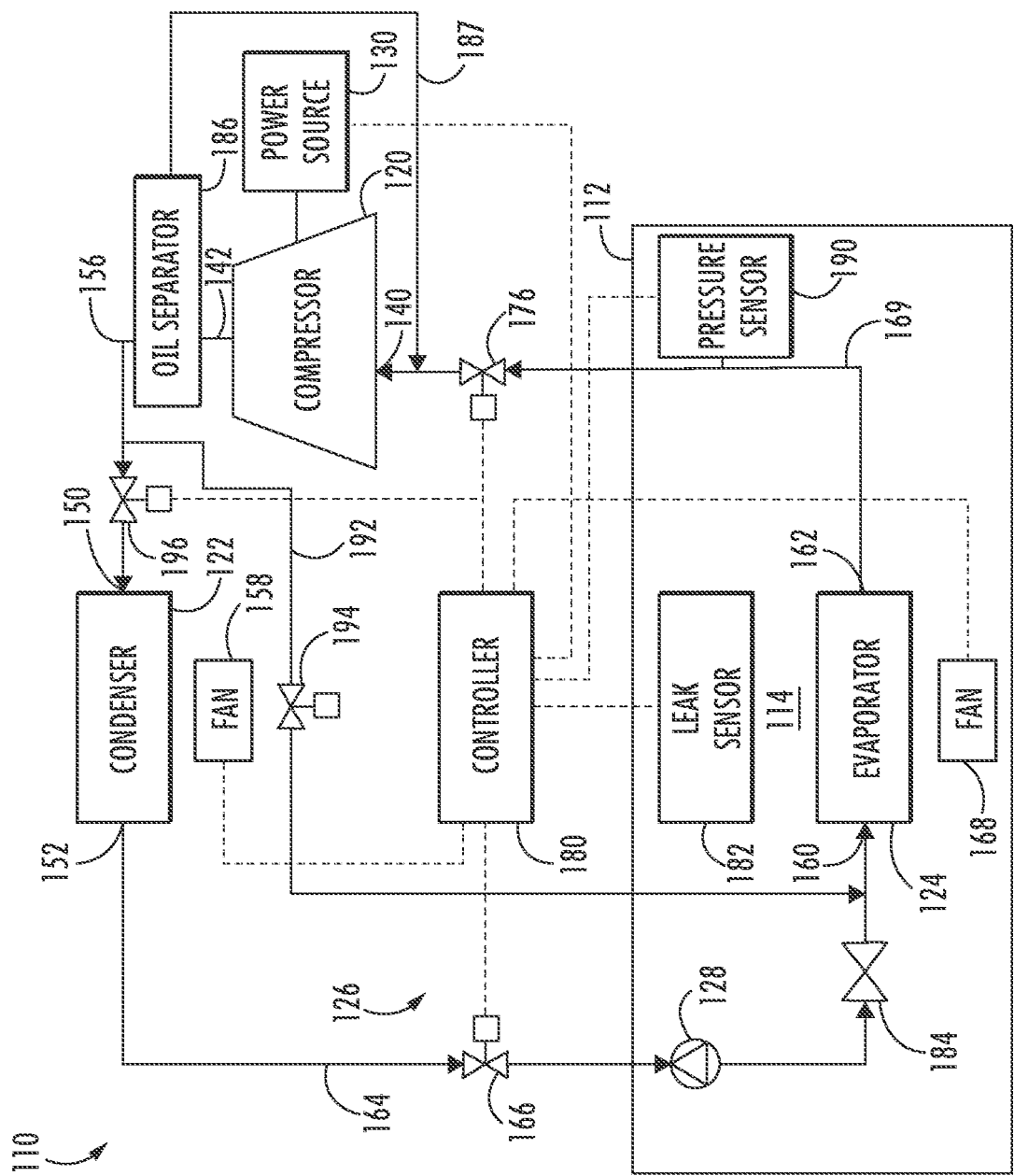
FIG. 3 is a schematic illustration of a refrigeration system.

Referring to FIG. 3, a refrigeration system 110 having a heat line 192 for hot gas by-pass is illustrated, in accordance with an embodiment of the present disclosure. A conditioned space 112 that provides conditioned air or cooled air to an interior volume 114 of the conditioned space 112 is illustrated in FIG. 3. The conditioned space 112 may include but is not limited to a refrigerated trailer, a refrigerated truck, a refrigerated space, or a refrigerated container. The refrigeration system 110 may be adapted to operate using a refrigerant such as a low global warming potential refrigerant including A1, A2, A2L, A3, etc. In some case the refrigerant may leak into the interior volume 114 and may present a hazard should the concentration of the leaked refrigerant within the interior volume 114 exceed a threshold level. The threshold level may be a lower flammability limit of the refrigerant. The evaporator 124, a portion of a refrigerant line 169 proximate an evaporator outlet 162, and a portion of a refrigerant line 164 proximate an evaporator inlet 60 may be located within the interior volume 114 of the conditioned space 112 and thus may be a potential source of a refrigerant leak into the interior volume 114.

The refrigeration system 110 may be a transport refrigeration system such as a transportation refrigeration unit. The refrigeration system 110 includes a compressor 120, a condenser 122, an evaporator 124, and a leak detection system 126 that is arranged to detect and mitigate the presence of refrigerant within an interior volume 114.

The compressor 120 is powered by or driven by a power source 130. The power source 130 may be an internal combustion engine that drives a generator that is arranged to provide power to the compressor 120 and other components of the refrigeration system 110.

The compressor 120 is arranged to receive refrigerant through a compressor inlet 140 from the evaporator 124. The compressor 120 is arranged to discharge refrigerant through a compressor outlet 142 to the condenser 122.

The condenser 122 is arranged to receive a fluid flow of refrigerant from the compressor 120 through a condenser inlet 150 and is arranged to discharge a fluid flow of refrigerant through a condenser outlet 152 to the evaporator 124. The condenser inlet 150 is fluidly connected to the compressor outlet 142 through a refrigerant line 156.

An oil separator 186 may be located within the refrigerant line 156 between the compressor 120 and the condenser 122 to remove oil from refrigerant leaving the compressor outlet 142 and direct the oil back to rotary components of the compressor 120.

A fan such as a condenser fan 158 may be associated with the condenser 122. The condenser fan 158 is disposed proximate the condenser 122.

The evaporator 124 is arranged to receive a fluid flow of refrigerant from the condenser 122 through an evaporator inlet 160 and is arranged to discharge a fluid flow of refrigerant to the compressor 120 through an evaporator outlet 162. The evaporator inlet 160 is fluidly connected to the condenser outlet 152 through a refrigerant line 164. The evaporator outlet 162 is fluidly connected to the compressor inlet 140 through a refrigerant line 169.

A first valve 166 may be located within the refrigerant line 164 between the condenser 122 and the evaporator 124. In at least one embodiment, the first valve 166 is arranged to selectively facilitate a fluid flow between the condenser outlet 152 and the evaporator inlet 160. The first valve 166 may be an expansion valve such as an electronic expansion valve, a movable valve, a solenoid valve, or a thermal expansion valve. The first valve 166 is movable between an open position and a closed position to selectively inhibit and facilitate a fluid flow of refrigerant between the evaporator 124 and the condenser 122. The open position facilitates a fluid flow of refrigerant between the condenser outlet 152 and the evaporator inlet 160. The closed position inhibits a fluid flow of refrigerant between the condenser outlet 152 and the evaporator inlet 160 through the refrigerant line 164.

A fan such as an evaporator fan 168 may be associated with the evaporator 124. The evaporator fan 168 is disposed proximate the evaporator 124.

A second valve 176 may be located within the refrigerant line 169 between the evaporator 124 and the compressor 120. In at least one embodiment, the second valve 176 is arranged to selectively facilitate a fluid flow between the evaporator outlet 162 and the compressor inlet 140. The second valve 176 may be a movable valve, solenoid valve, check valve, a liquid service valve, a thermal expansion valve, or an electronic expansion valve. The second valve 176 is movable between an open position and a closed position. The open position facilitates a fluid flow of refrigerant between the evaporator outlet 162 and the compressor inlet 140. The closed position inhibits a fluid flow of refrigerant between the evaporator outlet 162 and the compressor inlet 140. In an alternate embodiment, the second valve 176 may be interposed between the compressor outlet 142 and the condenser inlet 150.

In an embodiment, the first valve 166 and the second valve 176 may be located outside of the conditioned space 112.

A main heating valve 196 may be located within the refrigerant line 156 between the compressor 120 and the condenser 122. In at least one embodiment, the main heating valve 196 is arranged to selectively facilitate a fluid flow between the compressor outlet 142 and the condenser inlet 150. The main heating valve 196 may be a movable valve, a liquid service valve, a thermal expansion valve, or an electronic expansion valve. The main heating valve 196 is movable between an open position and a closed position. The open position facilitates a fluid flow of refrigerant between the compressor outlet 142 and the condenser inlet 150. The closed position inhibits a fluid flow of refrigerant between the compressor outlet 142 and the condenser inlet 150.

A heat line 192 may fluidly connect the compressor 120 and the refrigerant line 164 proximate the evaporator inlet 160. During a heating mode of the refrigeration system 110, the heat line 192 may deliver hot gas from the compressor 120 to the evaporator inlet 160, which may help defrost the evaporator and/or heat up the interior volume 114.

A hot gas valve 194 may be located within the heat line 192 between the compressor 120 and the evaporator 124. In at least one embodiment, the hot gas valve 194 is arranged to selectively facilitate a fluid flow between the compressor outlet 156 and the evaporator inlet 160. The hot gas valve 194 may be a movable valve, a liquid service valve, a thermal expansion valve, or an electronic expansion valve. The hot gas valve 194 is movable between an open position and a closed position. The open position facilitates a fluid flow of hot gas refrigerant between the compressor outlet 156 and the evaporator inlet 160. The closed position inhibits a fluid flow of hot gas refrigerant between the compressor outlet 156 and the evaporator inlet 160.

The refrigeration system 110 may include a check valve 128 located within the refrigerant line 164 between the first valve 166 and the evaporator 160, as shown in FIG. 3. The refrigeration system 110 may also include an expansion valve 184 located within the refrigerant line 164 between the check valve 128 and the evaporator 160, as shown in FIG. 3. The refrigeration system 110 may additionally include a pressure sensor 190 located within the refrigerant line 169 interposed between the evaporator 124 and the compressor inlet 140.

The leak detection system 126 includes a controller 180 and a leak sensor 182. The leak sensor 82 may be configured to detect refrigerant, detect a selected concentration of the refrigerant, and/or calculate a concentration of refrigerant. The leak sensor 182 may be located within the conditioned space 112. The controller 180 may be a controller that is provided with the transport refrigeration unit or may be a separately provided controller.

The controller 180 is provided with input communication channels that are arranged to receive information, data, or signals from, for example, at least one of the compressor 120, the power source 130, the condenser fan 158, the first valve 166, the evaporator fan 168, the second valve 176, and the leak sensor 182. The controller 180 is provided with output communication channels that are arranged to provide commands, signals, or data, for example, to the compressor 120, the power source 130, the condenser fan 158, the first valve 166, the evaporator fan 168, the pressure sensor 190, and the second valve 176. The controller 180 is provided with at least one processor that is programmed to execute a leak detection and/or leak mitigation strategy based on information, data, or signals provided via the input communication channels and output commands via the output communication channels.

The leak sensor 182 is arranged to provide a signal indicative of a concentration, an amount or the presence of refrigerant within the interior volume 114 to the controller 180. The leak sensor 182 may be disposed proximate the evaporator 124 and/or may be disposed proximate the refrigerant line 169 or any other refrigerant line or component that could leak refrigerant into the conditioned space 112. The leak sensor 182 may also be located near a likely location where refrigerant may collect such as near a floor of the conditioned space 112.

Figure 4:
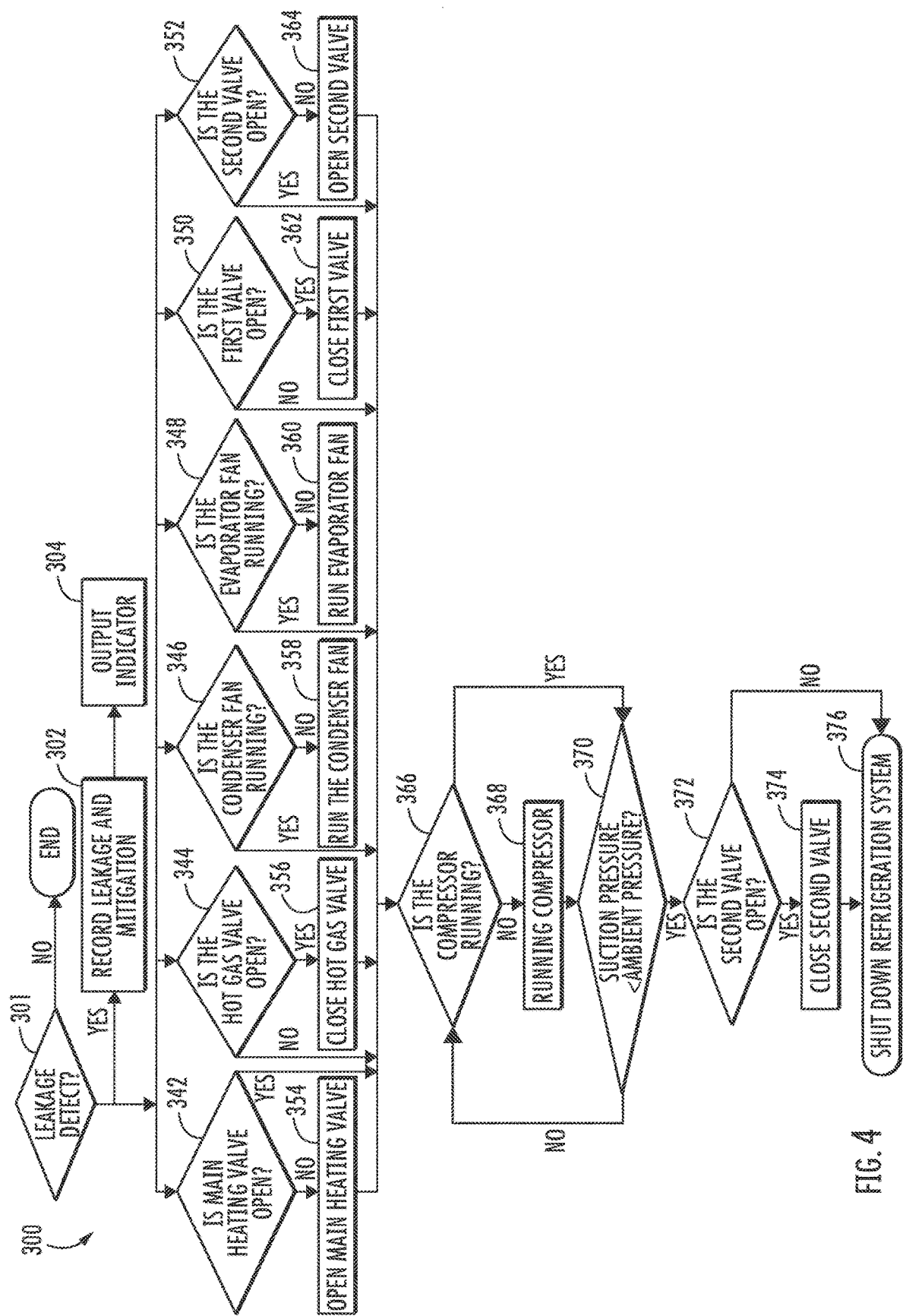
FIG. 4 is a flowchart illustrating a method of refrigerant leak mitigation for a refrigeration system.

Responsive to the signal from the leak sensor 182 being indicative of a concentration of refrigerant greater than a threshold concentration or the signal being indicative of the presence of refrigerant within the interior volume 114, the controller 180 may perform leak mitigation as illustrated by the flow chart in FIG. 4.

Referring to FIG. 4, with continued references to FIG. 3, a method 300 of leak detection in a refrigeration system 110 is illustrated in accordance with an embodiment of the present disclosure. In an embodiment, the method 300 may be performed by the controller 180. At block 301, should the leak sensor 182 not detect the presence of refrigerant or the concentration of refrigerant greater than a threshold concentration, the method 300 may end and/or continuously check for refrigerant leaks on a recurring basis. If the leak sensor 182 detects the presence of refrigerant or detects the concentration of refrigerant greater than a threshold concentration, the method 300 may continue to block 302. At block 302, the controller 180 may record the leak and the entrance of the leak mitigation strategy into memory. At block 304, the controller 180 is programmed to output for display an indicator. The indicator may be an auditory indicator, a visual indicator, or the like. In at least one embodiment, the controller 180 may transmit information or data indicative of the leak to a driver, operator, remote computing system, a remote monitoring system, or a display.

The controller 180 may assess the operational state of various components of the refrigeration system 110, in parallel, substantially simultaneously, or sequentially. At block 342, the controller 180 may assess whether the main heating valve 196 is open. At block 342, if the main heating valve 196 is not open then the controller 180 will open the main heating valve 196 at block 354. At block 344, the controller 180 may assess whether the hot gas valve 194 is open. At block 344, if the hot gas valve 194 is open then the controller 180 will close the hot gas valve 194 at block 356. At block 346, the controller 180 may assess whether the condenser fan 158 is on and operation (e.g., running). At block 346, if the condenser fan 158 is not running then the controller 180 may command the condenser fan 158 to run at block 358. The operation of the condenser fan 158 may facilitate the disbursement or dilution of refrigerant proximate the condenser 122 if a leak occurs on a condenser side of the refrigeration system 110. At block 348, the controller 180 may assess whether the evaporator fan 168 is on and in operation (e.g., running). At block 348, if the evaporator fan 168 is not running then the controller 180 may command the evaporator fan 168 to run at block 360. The operation of the evaporator fan 168 may facilitate the disbursement or dilution of refrigerant proximate the evaporator 124. At block 350, the controller 180 may assess whether the first valve 166 is open. At block 350, if the first valve 166 is open then the controller 180 will close the first valve 166 at block 362. At block 352, the controller 180 may assess whether the second valve 176 is open. At block 352, if the second valve 176 is closed then the controller 180 will open the second valve 176 at block 364.

At block 366, the controller 180 may assess whether the compressor 120 is on and operational (e.g. running). At block 366, if the compressor 180 is not on and operational then the controller 180 will run the compressor 180 before moving onto block 370. At block 370, the controller 180 may assess whether there is a suction pressure, such as a suction pressure less than an ambient pressure, within the refrigerant line 169 that extends between the evaporator 124 and the compressor 120. In such an embodiment, a pressure sensor 190 is configured to detect pressure within the refrigerant line 169 and communicate the detected pressure to the controller 180. At block 370, the method may alternatively assess a fluid pressure within the evaporator 124 (e.g. evaporator pressure) and determine whether the fluid pressure within the evaporator 124 is less than a threshold pressure. In such an embodiment, the pressure sensor 190 is disposed within or proximate the evaporator 124. Should the suction pressure be less than the ambient pressure or the evaporator pressure be less than a threshold pressure, the method 300 may continue to block 372. If the suction pressure is greater than the ambient pressure or the pressure within the evaporator 124 is greater than a threshold pressure, the method 300 may return to block 366.

At block 372, the controller 180 may assess whether the second valve 176 is open. At block 372, if the second valve 176 is open then the controller 180 will close the second valve 176 at block 374 before moving onto block 376. At block 376, the refrigeration system 110 is shut down. The leak mitigation strategy utilizing the pump down process greatly reduces the risk of the refrigerant reaching the lower flammability limit by removing and storing refrigerant from the evaporator 124 within the condenser 122. The leak mitigation strategy may also dilute or disperse refrigerant that may be present within the interior volume 114 of the conditioned space 112. If a refrigerant leak is in an area that is not exposed to the interior volume 114 than the refrigerant may dissipate on its own or with the aid of a condenser fan.

The term "about" is intended to include the degree of error associated with measurement of the particular quantity based upon the equipment available at the time of filing the application.

The terminology used herein is for the purpose of describing particular embodiments only is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A refrigeration system, comprising:
a compressor driven by a power source, the compressor having a compressor outlet and a compressor inlet;
a condenser having a condenser inlet, fluidly connected to the compressor outlet, and a condenser outlet;
an evaporator having an evaporator inlet, fluidly connected to the condenser outlet through a first valve movable between an open position and a closed position, and a evaporator outlet fluidly connected to the compressor inlet;
a leak sensor arranged to provide a signal indicative of a refrigerant;
a controller in communication with the first valve and the compressor, the controller being arranged to receive the signal and programmed to command the first valve to move towards the closed position, responsive to the signal being indicative of the refrigerant;
a main heat valve fluidly connecting the compressor outlet and the condenser inlet, the main heat valve being movable between an open position and a closed position,
wherein the controller is programed to command the main heat valve to move to the open position; and
a hot gas valve fluidly connecting the compressor and the evaporator inlet, the hot gas valve being movable between an open position and a closed position,
wherein the controller is programed to command the hot gas valve to move to the closed position prior to commanding the first valve to move towards the closed position.

2. The refrigeration system of claim 1, wherein the controller is further programmed to output for display an indicator.

3. The refrigeration system of claim 1, wherein the controller is further programmed to operate the compressor such that refrigerant within the evaporator is directed towards the compressor.

4. The refrigeration system of claim 3, wherein the controller is further programmed to command the compressor to stop operating, responsive to a fluid pressure between the evaporator outlet and the compressor outlet being less than a threshold pressure.

5. The refrigeration system of claim 3, further comprising:
a receiver having a receiver inlet fluidly connected to the condenser outlet,
wherein the receiver is arranged to receive the refrigerant from the condenser.

6. The refrigeration system of claim 1, wherein
the controller is arranged to receive the signal and programmed to command the first valve to move towards the closed position, responsive to the signal being indicative of a selected concentration of the refrigerant.

7. The refrigeration system of claim 1, wherein the controller is further programmed to operate an evaporator fan when refrigerant is detected.

8. The refrigeration system of claim 1, further comprising:
a second valve fluidly connecting the evaporator outlet and the compressor inlet,
the second valve being movable between an open position and a closed position.

9. The refrigeration system of claim 8, wherein
the controller is further programmed to operate the compressor such that refrigerant within the evaporator is directed towards the compressor until a suction pressure measurement proximate an inlet of the compressor is less than an ambient pressure.

10. The refrigeration system of claim 9, wherein
the controller is programmed to command the second valve to move towards the closed position when the suction pressure measurement proximate an inlet of the compressor is less than an ambient pressure.

11. The refrigeration system of claim 8, wherein
the evaporator and the leak sensor are located within a conditioned space of the refrigeration system, and
wherein the first valve and the second valve are located outside of the conditioned space.

12. A method of mitigating refrigerant leaks within a refrigeration system, comprising:
detecting a leak of a refrigerant from a refrigeration system;
closing a first valve to inhibit a fluid flow of the refrigerant between an evaporator and a condenser fluidly connected to the evaporator;
operating a compressor to direct another fluid flow of the refrigerant from the evaporator to the compressor;
directing the fluid flow of the refrigerant from the compressor to a receiver; and
closing a second valve to inhibit a fluid flow of the refrigerant between the receiver and the condenser.

13. The method of claim 12, further comprising:
operating an evaporator fan that is disposed proximate the evaporator.

14. The method of claim 12, further comprising:
stopping operation of the compressor, responsive to an evaporator pressure being less than a threshold pressure.

15. The method of claim 14, further comprising:
closing a second valve to inhibit a fluid flow of the refrigerant between the evaporator and the compressor.

16. A method of mitigating refrigerant leaks within a refrigeration system, comprising:
detecting a leak of a refrigerant from a refrigeration system;
closing a first valve to inhibit a fluid flow of the refrigerant between an evaporator and a condenser fluidly connected to the evaporator;
operating a compressor to direct another fluid flow of the refrigerant from the evaporator to the compressor;
opening a main heat valve to allow a fluid flow of the refrigerant between the compressor and the condenser; and
closing a hot gas valve to inhibit a fluid flow of the refrigerant between the compressor and the evaporator.

* * * * *